(No Model.)
W. T. SEARS.
DEVICE FOR ATTACHING SHAFTS TO VEHICLES.
No. 530,801. Patented Dec. 11, 1894.
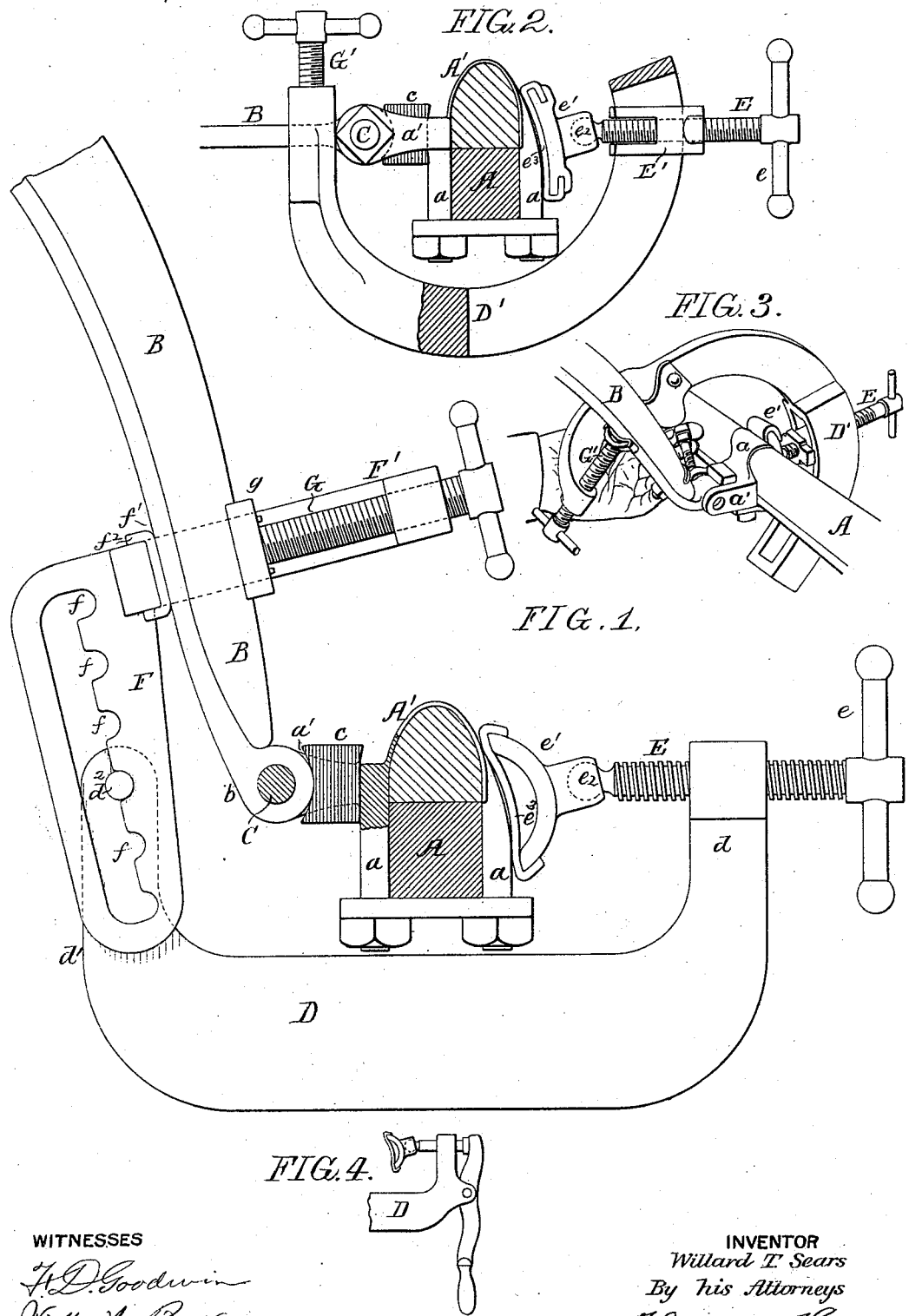
WITNESSES
F. D. Goodwin
Will. A. Barr
INVENTOR
Willard T. Sears
By his Attorneys
Howson & Howson

UNITED STATES PATENT OFFICE.

WILLARD T. SEARS, OF PHILADELPHIA, PENNSYLVANIA.

DEVICE FOR ATTACHING SHAFTS TO VEHICLES.

SPECIFICATION forming part of Letters Patent No. 530,801, dated December 11, 1894.

Application filed June 7, 1894. Serial No. 513,738. (No model.)

*To all whom it may concern:*

Be it known that I, WILLARD T. SEARS, a citizen of the United States, residing in Philadelphia, Pennsylvania, have invented a certain Device for Attaching Shafts to Vehicles, of which the following is a specification.

The object of my invention is to construct a device for attaching shafts or poles to vehicles; the main object of my invention being to so construct the device that the shaft can be forced into position against the pressure of the anti-rattler, so that the bolt can be inserted without stripping the thread and without injuring the carriage.

In the accompanying drawings:—Figure 1, is a side view of my improved device for attaching shafts or poles to vehicles. Fig. 2, is a view of a modification of the device; said view being partly in section. Fig. 3, is a view of the device shown in Fig. 2, arranged above the axle. Fig. 4, is a view of a modification.

A is the axle. A' is the coupling secured to the axle by depending bolts $a\ a$. This coupling has two arms $a'$ having holes for the passage of the pivot bolt C. Between the two arms is inserted the end $b$ of the shaft B. This end has a hole for the passage of the bolt C.

Usually the anti-rattling device $c$ consists either of a block of rubber or a metal spring which is inserted back of the shaft between the two arms $a\ a$. Consequently when the shaft is inserted in the coupling the anti-rattler must be compressed so that the hole in the shaft will align with the holes in the arms to allow for the insertion of the shaft bolt. Usually when the shaft is forced in position the parts are scratched and otherwise marred and the bolt is in many cases stripped of its thread.

By the device which I will now proceed to describe the shaft can be readily inserted without marring the parts and it can be held in position for the passage of the bolt.

Referring to Fig. 1, D is a frame, U-shaped in the present instance, and adapted to the arm $d$ of the frame is a screw E having handles $e$ and a bearing plate $e'$ connected to the screw by a ball and socket joint $e^2$. The bearing plate has a yielding head $e^3$ preferably made of leather and secured to the plate by rivets, as shown in Fig. 1, or by a clamp, as shown in Fig. 2.

On the arm $d'$ of the frame D is a pin $d^2$ with which engages the head F secured to the shaft by a clamp screw G. In the head are a series of pockets $f$, into any one of which the pin $d^2$ may be adjusted, depending upon the curve of the shaft.

The head F has a socket $f'$ for the reception of the shaft B and this socket is lined with leather $f^2$ or other suitable material. The screw G is adapted to an arm F' projecting from the head and has a bearing plate $g$ similar to the bearing plate $e'$.

In order to couple the shaft to the carriage the head F is clamped to the shaft, as shown in Fig. 1, by the clamp screw G and the head is adjusted on the frame D so that the end of the shaft will be in a direct line with the coupling and with the screw E and pin $d^2$, after which the screw E is turned so as to draw the head F and the shaft in a direct line toward the axle and into the coupling and when the hole in the end of the shaft aligns with the holes in the coupling the pin C is passed through the holes and secured in position. Thus by this means the rubber or spring is compressed without injury to any of the parts and without the necessity of trimming the rubber which is often done to more readily insert the shaft.

In Fig. 2, I have shown the frame D' rigidly secured to the shaft B by a screw G' and slotted to receive a head E' carrying the clamp screw E, this slot taking the place of the series of pockets $f$, shown in Fig. 1.

In Fig. 4, I have shown a lever used in the place of the screw, as it will be understood that equivalents of the screws may be used without departing from my invention.

While I have shown the frame D mounted below the axle in Figs. 1 and 2, it may in some instances be desirable to mount the frame above the axle, as shown in Fig. 3, and this can be readily done without departing from my invention.

The swiveled head on the screw E will readily accommodate itself to the irregularities of the coupling, and being padded will not disfigure the finish of the carriage.

The frame may be shaped in order to accommodate different makes of carriages or wagons, without departing from my invention.

I claim as my invention—

1. The combination in a device for attaching shafts or poles to vehicles, of the frame adapted to the axle, with a clamp to which the shaft or pole is rigidly secured, and means for drawing the shaft or pole toward the axle and the end of the shaft or pole into the coupling against the pressure of the anti-rattling device, substantially as described.

2. The combination in a device for attaching shafts or poles to vehicles, of the frame partially encircling the axle, a head adjustable thereon, one of said parts being rigidly secured to the shaft, with a pressure device carried by the other part and adapted to rest against the rear of the axle and to draw the shaft in a direct line toward the coupling, substantially as specified.

3. The combination of the frame D having two arms, a clamping screw E mounted in one arm, a head F pivoted to the other arm, a clamp on said head by which it is rigidly secured to the shaft or pole, substantially as described.

4. The combination of the frame D having two arms, a pin $d^2$ on one arm, a head F having a series of notches adapted to the pin, a clamp screw engaging with the shaft or pole and by which the head is rigidly secured to the shaft or pole, with a clamping screw E adapted to the arm $d$ of the frame D and adapted to force the shaft or pole into position against the pressure of the anti-rattling device, substantially as described.

5. The combination of the frame D, a head F adjustably mounted on the frame, a clamp for securing the head rigidly to the shaft or pole, a clamping screw carried by the frame and having a swiveled bearing plate adapted to force the shaft or pole into position, substantially as described.

In testimony whereof I have signed my name to this specification in the presence of two subscribing witnesses.

WILLARD T. SEARS.

Witnesses:
 MURRAY C. BOYER,
 WILL A. BARR.